US010365373B2

(12) United States Patent
Ishio

(10) Patent No.: US 10,365,373 B2
(45) Date of Patent: Jul. 30, 2019

(54) VEHICLE-MOUNTABLE DISTANCE MEASUREMENT DEVICE

(71) Applicant: Wataru Ishio, Aichi (JP)

(72) Inventor: Wataru Ishio, Aichi (JP)

(73) Assignee: OMRON AUTOMOTIVE ELECTRONICS CO., LTD., Aichi (JP)

( * ) Notice: Subject to any disclaimer, the term of this patent is extended or adjusted under 35 U.S.C. 154(b) by 294 days.

(21) Appl. No.: 15/063,583

(22) Filed: Mar. 8, 2016

(65) Prior Publication Data

US 2016/0313447 A1    Oct. 27, 2016

(30) Foreign Application Priority Data

Apr. 24, 2015 (JP) ................. 2015-088963

(51) Int. Cl.
*G01S 17/93* (2006.01)
*G01S 17/08* (2006.01)
(Continued)

(52) U.S. Cl.
CPC ........... *G01S 17/936* (2013.01); *G01C 11/02* (2013.01); *G01C 21/26* (2013.01); *G01S 7/487* (2013.01);
(Continued)

(58) Field of Classification Search
CPC .... G01S 17/936; G01S 7/4814; G01S 7/4863; G01S 7/487; G01S 17/08; G01S 17/10; G01C 11/02; G01C 21/26
See application file for complete search history.

(56) References Cited

U.S. PATENT DOCUMENTS 7,605,909 B2  10/2009 Yamaguchi et al.
2003/0218919 A1* 11/2003 Arita ................. G01S 17/42
                                                           365/200
(Continued)

FOREIGN PATENT DOCUMENTS

EP    2182378 A1 *  5/2010 ............. G01S 7/483
JP    H05-149712 A   6/1993
(Continued)

OTHER PUBLICATIONS

"Photodiode Arraya Support Diverse Applications", Laser Focus World. Feb. 1, 2003. (Year: 2003).*

*Primary Examiner* — Samantha K Abraham
(74) *Attorney, Agent, or Firm* — Osha Liang LLP

(57) ABSTRACT

A vehicle-mountable distance measurement device is mountable in a vehicle and measures a distance from an object existing in surroundings. The vehicle-mountable distance measurement device includes: a light projection unit which projects measurement light in which a two-dimensional predetermined pattern specific to the vehicle is repeated; a light receiving unit including a plurality of light receiving elements which are arranged in a two-dimensional manner and which output light receiving signals in response to reception of light; and a distance detection unit which calculates the distance from the object based on a time when the light projection unit projects light and a time when the light receiving unit receives light. The distance detection unit calculates the distance from the object based on the time when the light receiving unit receives the measurement light having the predetermined pattern projected by the light projection unit.

3 Claims, 11 Drawing Sheets

(51) Int. Cl.
  *G01S 17/10*    (2006.01)
  *G01S 7/481*    (2006.01)
  *G01S 7/486*    (2006.01)
  *G01S 7/487*    (2006.01)
  *G01C 11/02*    (2006.01)
  *G01C 21/26*    (2006.01)

(52) U.S. Cl.
  CPC .......... *G01S 7/4814* (2013.01); *G01S 7/4863* (2013.01); *G01S 17/08* (2013.01); *G01S 17/10* (2013.01)

(56) References Cited

U.S. PATENT DOCUMENTS

2013/0003041 A1* 1/2013 Sigmund ................. G01S 7/487
                                                        356/5.01
2013/0325241 A1* 12/2013 Lombrozo ............ B60W 40/00
                                                         701/23
2014/0350836 A1* 11/2014 Stettner ................. G01S 17/023
                                                        701/301

FOREIGN PATENT DOCUMENTS

JP    2006-308482 A    11/2006
JP    2013-124941 A     6/2013

* cited by examiner

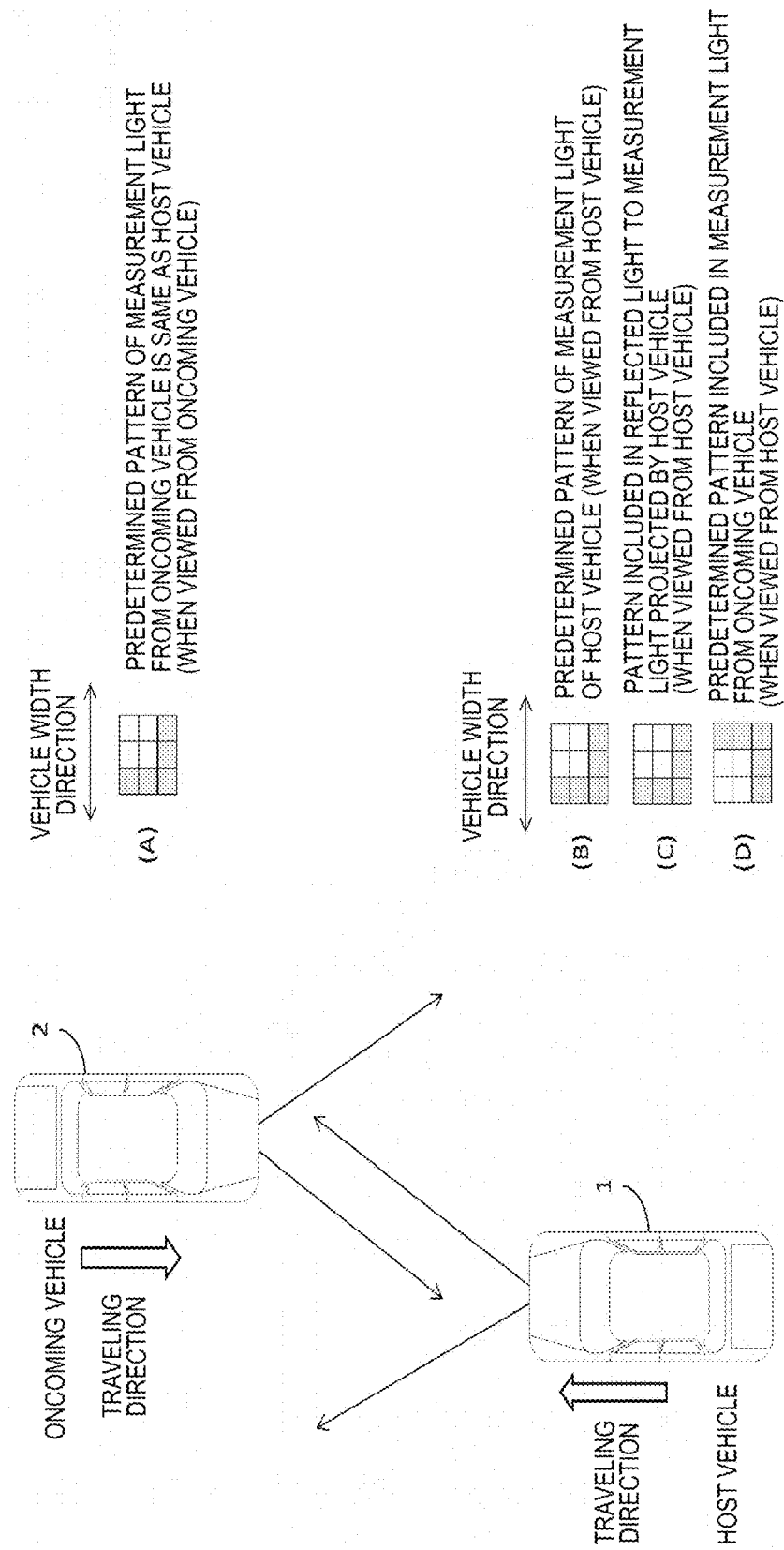

FIG. 12A
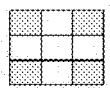 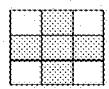
FIG. 12B
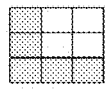 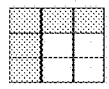
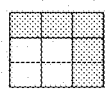 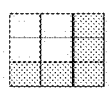
FIG. 12C
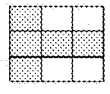 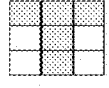
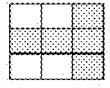 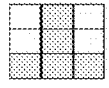
FIG. 12D
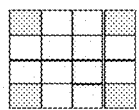
FIG. 12E
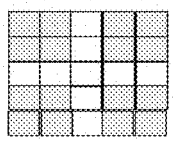

VEHICLE-MOUNTABLE DISTANCE MEASUREMENT DEVICE

CROSS-REFERENCES TO RELATED APPLICATIONS

This application is based upon and claims the benefit of priority from Japanese Patent Application No. 2015-088963, filed on Apr. 24, 2015; the entire contents of which are incorporated herein by reference.

FIELD

One or more embodiments of the present invention relate to a vehicle-mountable distance measurement device which is mounted in a vehicle.

BACKGROUND

A distance measurement device which is mounted in a vehicle, and for example, projects a laser beam to measure the distance from an object using a time difference until a laser beam reflected from the object is received is hitherto known. If the number of vehicles in which such an object detection device is mounted becomes large, there is an increasing possibility that a laser beam projected by another vehicle is received. In such a case, if a laser beam projected by another vehicle is received immediately after the distance measurement device of the host vehicle projects light, the distance from the object is measured using the time difference; thus, there is a problem in that an erroneous distance is measured.

As a countermeasure for such a problem, for example, JP-A-2006-308482 discloses a detection device which irradiates a target position with a laser beam for preventing erroneous detection in a case where a laser beam from an oncoming vehicle is received, or the like, to detect the situation of the target position. This detection device modulates a pulsed laser beam with a modulation pattern individually set for each target position among several modulation patterns and outputs the pulsed laser beam from a laser emission unit to the target position. Then, it is detected that there is an obstacle at the target position only when the modulation pattern of the pulsed laser beam output from the laser emission unit matches the modulation pattern of the pulsed laser beam received by the laser receiving unit, and the distance from the obstacle is measured. With this, even if a pulsed laser beam is erroneously received from the oncoming vehicle or the like, erroneous detection of the situation of the target position based on the received pulsed laser beam is suppressed.

JP-A-H05-149712 discloses a distance measurement method for an automobile capable of preventing mutual interference in a case where a laser beam is used and reflected light is detected to measure the distance from an object. The distance measurement method for an automobile constitutes an optical signal transmitted from transmission means to have a frame structure with a vehicle code assigned to each vehicle in a head portion, identifies a vehicle code of an optical signal received by receiving means using vehicle code identification means, determines whether the received optical signal is transmitted from the host vehicle or another vehicle, stops the transmission of the optical signal from the host vehicle if the optical signal is transmitted from another vehicle, and transmits the optical signal from the host vehicle after the transmission of the optical signal from another vehicle ends.

JP-A-2013-124941 discloses a distance measurement device which projects a two-dimensional pattern onto a subject to detect the distance to the subject. For example, a circular pattern is projected onto the subject, the diameter of the circle projected onto the subject is detected, and the distance to the subject is measured based on the detection result.

SUMMARY

In JP-A-2006-308482, since a combination of a plurality of laser beam pulses on a time axis is irradiated, there is a problem in that the time is extended compared to a case where a single pulse is irradiated and reflected light is received to measure the distance to the object. In JP-A-H05-149712, although the pulse light of the vehicle code is added before light for measurement, there is a problem in that the time for sending all optical signals is extended. Accordingly, in the inventions disclosed in both patent documents, in other words, a pattern is formed along the time axis. For this reason, the time for sending the optical signal is extended, and in recognizing the pattern, the time until pulsed light is received is extended since all pulsed light formed on the time axis formed on the time axis is received. A problem still remains when it is necessary to detect an object at a high speed.

Accordingly, one or more embodiments of the invention provides a vehicle-mountable distance measurement device which reduces interference with a device mounted in another vehicle and detects an object at a high speed to measure a distance.

In order to solve the above-described problem, a vehicle-mountable distance measurement device which is mountable in a vehicle and which measures a distance from an object existing in surroundings includes a light projection unit which projects measurement light in which a two-dimensional predetermined pattern specific to the vehicle is repeated, a light receiving unit including a plurality of light receiving elements which are arranged in a two-dimensional manner and which output light receiving signals in response to reception of light, and a distance detection unit which calculates a distance from the object based on a time when the light projection unit projects light and the time when the light receiving unit receives light. The distance detection unit calculates the distance from the object based on the time when the light receiving unit receives the measurement light having the predetermined pattern projected by the light projection unit.

With this configuration, the predetermined pattern is formed in measurement light for distance measurement, whereby it is possible to provide a vehicle-mountable distance measurement device which reduces interference with a device mounted in another vehicle and detects the object at a high speed to measure the distance.

The vehicle-mountable distance measurement device may further include a signal processing unit which samples the light receiving signals output from the respective light receiving elements of the light receiving unit and which outputs a plurality of sampling values, and a pattern detection unit which detects the predetermined pattern based on the plurality of sampling values output from the signal processing unit at a same time, and the distance detection unit may calculate the distance from the object based on, as the time when the light receiving unit receives light, a time of the plurality of sampling values at which the pattern detection unit detects the predetermined pattern.

With this configuration, light received by the light receiving unit is sampled and detected reliably, and the distance from the object is calculated based on the time when the sampling value when the predetermined pattern is detected, whereby it is possible to measure the distance at a high speed.

The predetermined pattern may be asymmetrical in a vehicle width direction of the vehicle.

With this configuration, even if the patterns of measurement light respectively projected by the host vehicle and the oncoming vehicle are the same, since the pattern is asymmetrical, it is possible to perform identification.

As described above, according to one or more embodiments of the invention, it is possible to provide a vehicle-mountable distance measurement device which reduces interference with a device mounted in another vehicle by forming the predetermined pattern in measurement light for distance measurement and detects the object at a high speed to measure the distance.

BRIEF DESCRIPTION OF THE DRAWINGS

FIG. 11 is an explanatory view illustrating a case of measuring the distance between an oncoming vehicle and a host vehicle in the distance measurement device according to the first embodiment of the invention; and FIGS. 12A to 12E are explanatory views illustrating variation in a predetermined pattern of measurement light according to one or more embodiments of the invention.

DETAILED DESCRIPTION

Figure 1:
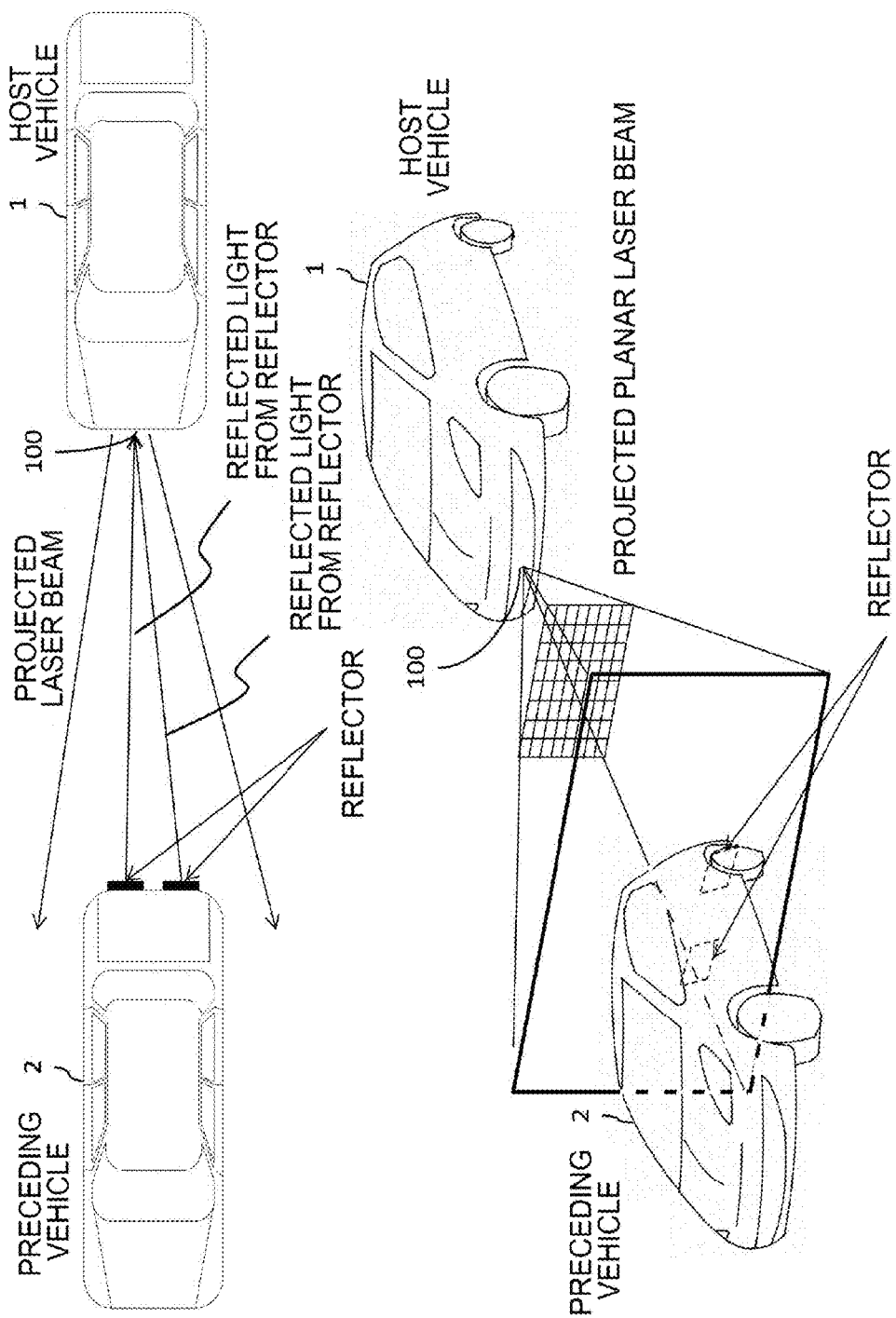
FIG. 1 is an explanatory view illustrating a case of measuring the distance from a preceding vehicle in front of a host vehicle in a distance measurement device according to a first embodiment of the invention.

In embodiments of the invention, numerous specific details are set forth in order to provide a thorough understanding of the invention. However, it will be apparent to one of ordinary skill in the art that the invention may be practiced without these specific details. In other instances, well-known features have not been described in detail to avoid obscuring the invention.

Hereinafter, an embodiment of the invention will be described referring to the drawings.

First Embodiment

A case where a vehicle 1 (host vehicle) having a distance measurement device 100 of this embodiment mounted therein measures the distance from a preceding vehicle which is an object 2 in the surroundings will be described referring to FIG. 1. The distance measurement device 100 is provided near the center of a front bumper of the vehicle 1, and is provided to irradiate a rear portion of the preceding vehicle in front of the vehicle 1.

The distance measurement device 100 outputs and projects a laser beam and receives the laser beam irradiated to and reflected from the rear portion of the preceding vehicle as reflected light. Usually, since a reflector which reflects light better compared to other portions is attached to a rear portion of a vehicle, the presence of a preceding vehicle is detected based on reflected light from the reflector. As described below, the distance measurement device 100 projects two-dimensional measurement light which spreads forward, and detects the presence of a preceding vehicle based on reflected light if the preceding vehicle is within a range where the projected laser beam reaches. The distance measurement device 100 detects the presence of the preceding vehicle, and measures the distance between the host vehicle and the preceding vehicle by measuring the time until the laser beam is reflected from the preceding vehicle and returned after being emitted.

The distance measurement device 100 will be described in detail referring to FIGS. 2 to 5. The distance measurement device 100 includes a light projection unit 10 which projects measurement light, a light receiving unit 20 which outputs light receiving signals in response to reception of light, a distance detection unit 31 which calculates the distance from a preceding vehicle, and a control unit 50 which performs overall control of the device.

Figure 3:
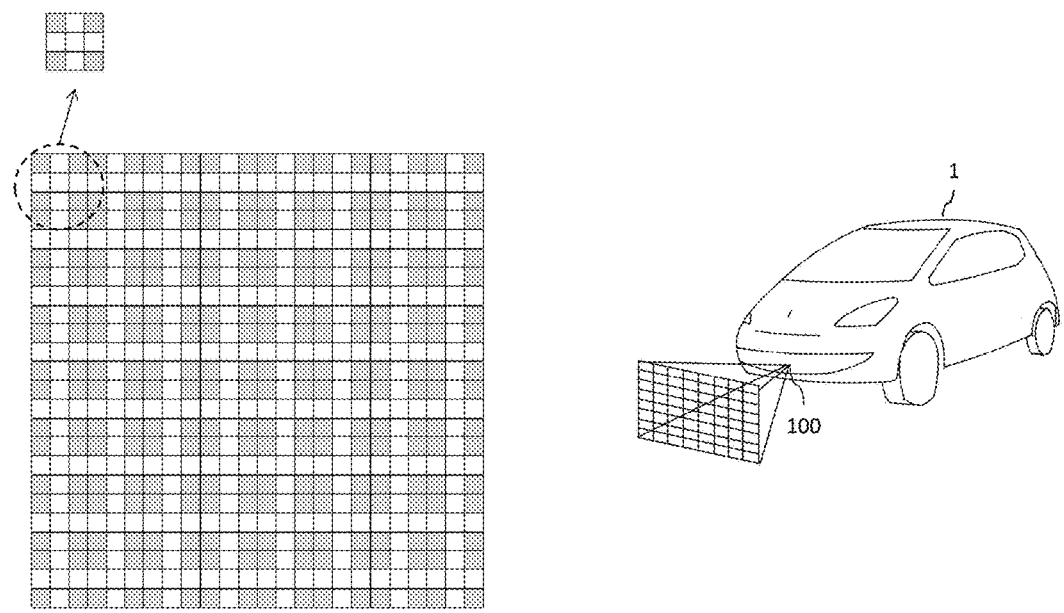
FIG. 3 is a schematic view showing a predetermined pattern of measurement light projected by a light projection unit according to the first embodiment of the invention.
Figure 4:
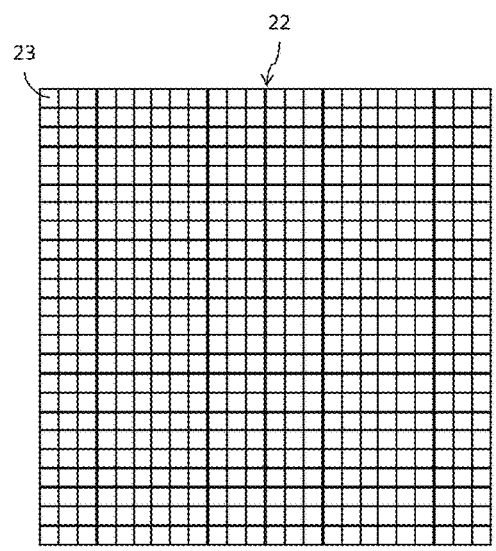
FIG. 4 is a schematic view of a light receiving element array according to the first embodiment of the invention.

The light projection unit 10 includes a light emitting element 12 which is constituted of a semiconductor laser configured to emit a projected laser beam, a drive circuit 11 which drives the light emitting element 12, modulation means 13 for changing the intensity (amplitude), wavelength, or the like of the laser beam, and a light projection lens 14 which projects the laser beam, and projects light under the control of the control unit 50. As illustrated in FIG. 3, the light projection unit 10 projects measurement light with a predetermined pattern specific to the vehicle 1 repeated in a two-dimensional manner. In this embodiment, in measurement light projected by the light projection unit 10, one predetermined pattern is formed of 3×3 lattices, and this pattern is repeated in a two-dimensional manner by eight patterns in vertical and horizontal directions.

In this embodiment, although a case where a predetermined pattern is formed with the difference in the intensity of the laser beam has been described, the invention is not limited thereto. For example, measurement light of a predetermined pattern obtained by modulating light having a wavelength A to partially have a wavelength B is projected, and a filter which transmits only the wavelength A is provided on the light receiving unit side, whereby the light receiving unit can receive the predetermined pattern. In this drawing, a gray portion expresses that the intensity of the projected laser beam is low compared to a white portion. That is, in the four grids at the corners among the nine grids of 3×3, the intensity of the projected laser beam is lower than other grids. The difference in intensity is appropriately determined to be obtained as a significant difference when reflected light is received. For example, the white portion has intensity five times stronger than the gray portion.

It is preferable that the predetermined pattern is a pattern which is different for each vehicle in which the distance measurement device 100 is mounted. However, practically, since there are a finite number of predetermined patterns, the distance measurement devices 100 which use the same predetermined pattern may be mounted even in different vehicles. The predetermined pattern is appropriately determined depending on the number of pixels of the light receiving element array 22, the size of an object to be measured, and the distance to be measured.

Specifically, if two-dimensional measurement light is projected in front of the host vehicle, since measurement light is diffused, measurement light has a larger area on a distant side. Accordingly, the predetermined pattern has a larger area on a distant side. For example, it is assumed that a measurable distance required for the distance measurement device 100 is a maximum of 50 m, and an object to be measured is, for example, a reflector of a vehicle. In this case, although measurement light projected from the host vehicle reaches a reflector of a vehicle at a distance of 50 m in front of the host vehicle while being diffused, the size of the predetermined pattern which is diffused and increased in area should be smaller than the reflector. In other words, the entire predetermined pattern should be included in reflected light reflected from the reflector. That is, the size of the predetermined pattern is determined in consideration of the size diffused at a distance of 50 m forward and the size of a measurement target.

For example, it is assumed that the shortest measurable distance required for the distance measurement device 100 is 1 m, and an object to be measured is, for example, a reflector of a vehicle. In this case, although measurement light projected from the host vehicle reaches the reflector of the vehicle at a distance of 1 m in front of the host vehicle while being diffused, the size of the predetermined pattern which is diffused and increased in area should be smaller than the reflector. Then, in a case where reflected light reflected from the reflector is received by the light receiving element, the number of pixels of the light receiving element should be large to such an extent that the predetermined pattern included in reflected light can be identified.

As shown in FIG. 3, the light receiving unit 20 is constituted of a charge-coupled device (CCD) camera including a light receiving lens 21 which condenses measurement light projected by the light projection unit 10 and reflected from the preceding vehicle and a light receiving element array 22 which senses measurement light condensed by the light receiving lens 21, converts measurement light to a light receiving signal, and forms an image. That is, the light receiving unit 20 has a plurality of light receiving elements 23 which are arranged in a two-dimensional manner to output light receiving signals in response to reception of light. The light receiving element array may be a CMOS camera, and may have a configuration in which elements for receiving a laser beam or infrared rays are arranged in a two-dimensional manner.

The light receiving element array 22 in the light receiving unit 20 preferably has the number of pixels equal to or greater than the grids of the two-dimensional laser beam projected by the light projection unit 10, as shown in FIG. 3, has 24×24 pixels equal to the number of grids of the laser beam projected by the light projection unit 10, and can form an image with the same resolution as the intensity distribution of the projected laser beam.

The distance detection unit 31 obtains, from the control unit 50, the time when the light projection unit 10 projects a laser beam having a predetermined pattern specific to the vehicle 1 and the time when the light receiving unit 20 receives reflected light having the predetermined pattern. The distance detection unit 31 calculates the distance between the host vehicle and the preceding vehicle by measuring the time until the laser beam is reflected from the preceding vehicle and returned after being emitted based on the times. With this, the predetermined pattern is formed in measurement light for distance measurement, whereby it is possible to provide a vehicle-mountable distance measurement device which reduces interference with a device mounted in another vehicle and detects an object at a high speed to measure a distance. The distance detection unit 31 and the control unit 50 are provided in a microcomputer.

Figure 2:
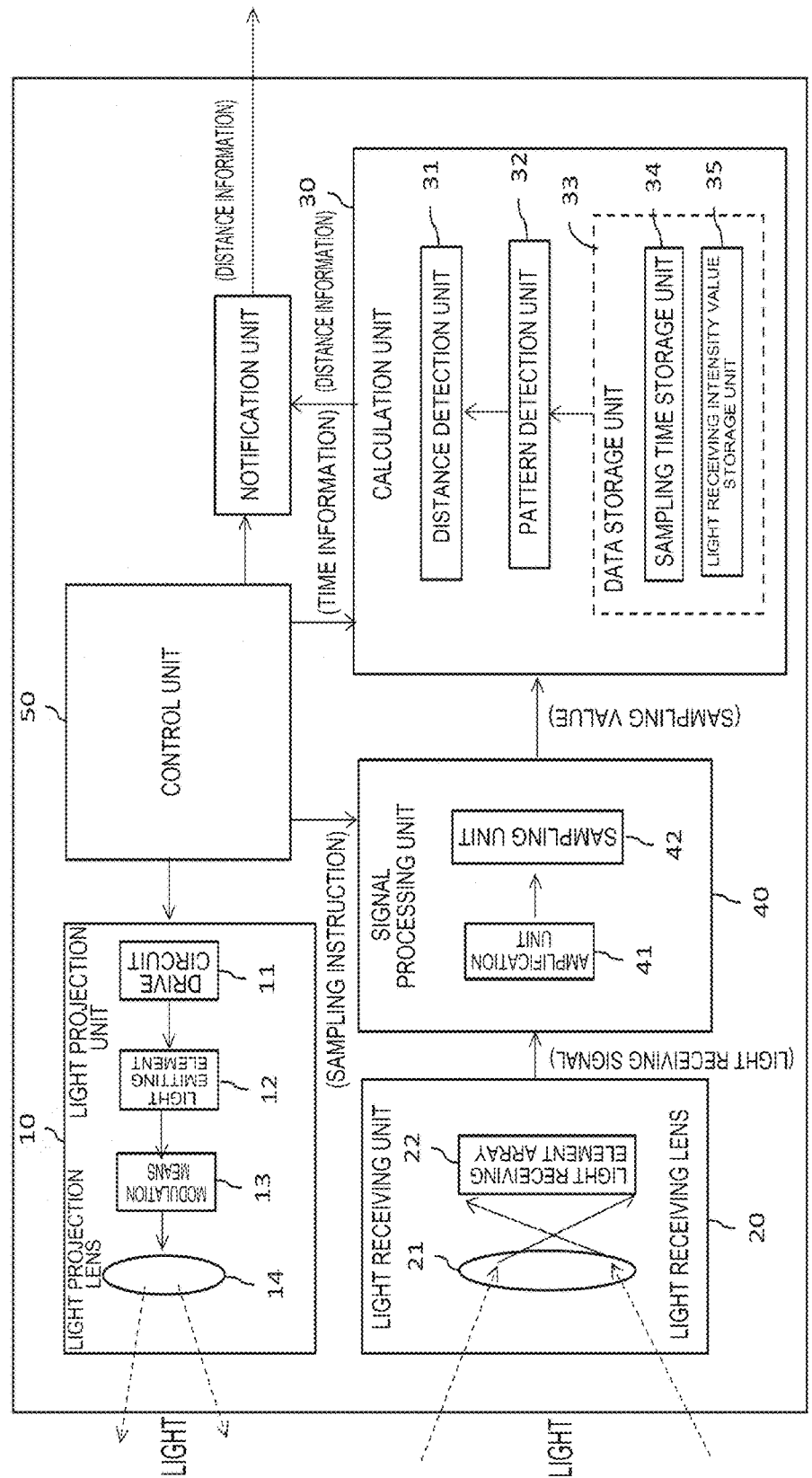
FIG. 2 is a block diagram of the distance measurement device according to the first embodiment of the invention.

As shown in FIG. 2, the distance measurement device 100 further includes a signal processing unit 40 which samples the light receiving signals output from the respective light receiving elements 23 of the light receiving unit 20 and outputs sampling values, a calculation unit 30 which includes a pattern detection unit 32 and a data storage unit 33 in addition to the distance detection unit 31, and a notification unit 60 which visually and aurally notifies a user of distance information calculated by the distance detection unit 31.

Figure 5:
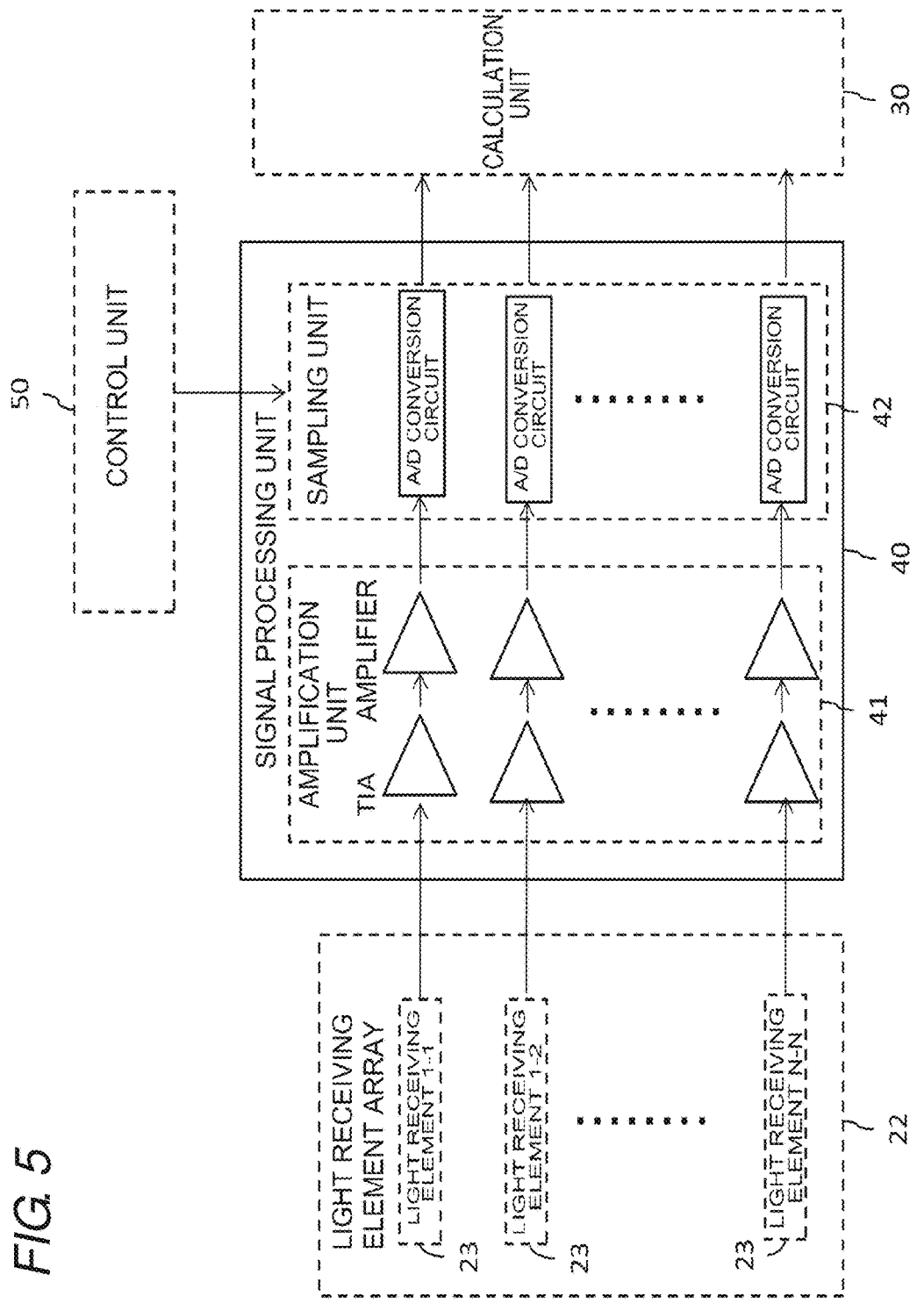
FIG. 5 is a block diagram of a signal processing unit according to the first embodiment of the invention.

The signal processing unit 40 has an amplification unit 41 which receives the light receiving signals from the respective light receiving elements 23, and a sampling unit 42 which receives the light receiving signals amplified by the amplification unit 41. As shown in FIG. 5, the amplification unit 41 has current-voltage conversion circuits (transimpedance amplifiers (TIA)) which directly receive the light receiving signals from the respective light receiving elements 23 and amplifiers, and is configured to allow detection of a difference in signal intensity even if the light receiving signals output from the light receiving elements 23 have a weak current. The sampling unit 42 samples the light receiving signals amplified by the amplification unit 41 at a predetermined interval, converts the light receiving signals to digital values using A/D conversion circuits, and delivers the sampling values to the calculation unit 30. The sampling unit 42 processes the light receiving signals corresponding to measurement light, which is projected by the light projection unit 10, reflected, and returned, based on the start of sampling instructed by the control unit 50 or a sampling interval.

The calculation unit 30 includes the data storage unit 33 having a sampling time storage unit 34 and a light receiving intensity value storage unit 35. The sampling time storage unit 34 stores the sampling time when the signal processing unit 40 samples the light receiving signals. The light receiving intensity value storage unit 35 stores the sampling values of the light receiving signals sampled by the signal processing unit 40 as light receiving intensity in association with the sampling time. The calculation unit 30 includes the pattern detection unit 32 which detects the predetermined pattern specific to the vehicle 1 projected by the light projection unit 10 using the sampling value of the same sampling time among the sampling values stored in the data storage unit 33 corresponding to the light receiving elements 23. That is, the pattern detection unit 32 detects the predetermined pattern based on a plurality of sampling values of the same time output from the signal processing unit 40.

The distance detection unit 31 calculates the distance between the host vehicle and the preceding vehicle by measuring the time until the laser beam is reflected from the preceding vehicle and returned after being emitted based on the time (light projection time) when the light projection unit 10 projects the laser beam having the predetermined pattern specific to the vehicle 1 and the time (light receiving time) when the light receiving unit 20 receives reflected light having the predetermined pattern. In a case where the signal processing unit 40 outputs the sampling values, the distance detection unit 31 calculates the distance from the preceding vehicle with the sampling time corresponding to a plurality of sampling values when the pattern detection unit 32 detects the predetermined pattern specific to the vehicle 1 as the light receiving time.

Figure 6:
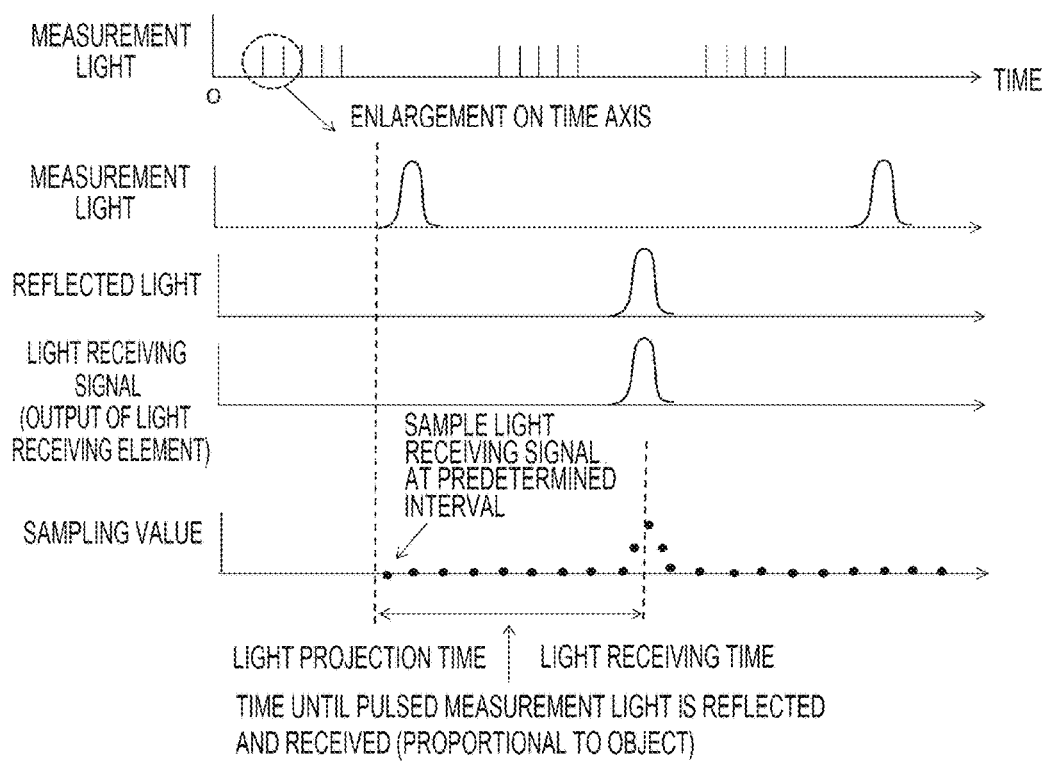
FIG. 6 is an explanatory view illustrating a way of measuring a distance based on a light projection time and a light receiving time in the distance measurement device according to the first embodiment of the invention.

The calculation of the distance based on the light projection time and the light receiving time in the distance detection unit 31 in a case where the signal processing unit 40 outputs the sampling values will be described referring to FIG. 6. FIG. 6 is an explanatory view illustrating a way of measuring the distance based on the light projection time and the light receiving time for one light receiving element 23.

The uppermost stage indicates pulsed measurement light which is intermittently projected by the light projection unit 10. The light projection unit 10 projects five pulses as one group at short intervals and intermittently and repeatedly projects one group of pulses. The second stage expresses first two pulsed measurement light beams in the uppermost stage on the time axis on an enlarged scale. The third stage indicates reflected light of the first measurement light, and the fourth stage indicates the light receiving signal output from the light receiving element 23 corresponding to reflected light. The fifth stage indicates that the signal processing unit 40 outputs the sampling values which make the light receiving signals from continuous values to discrete values.

Figure 7:
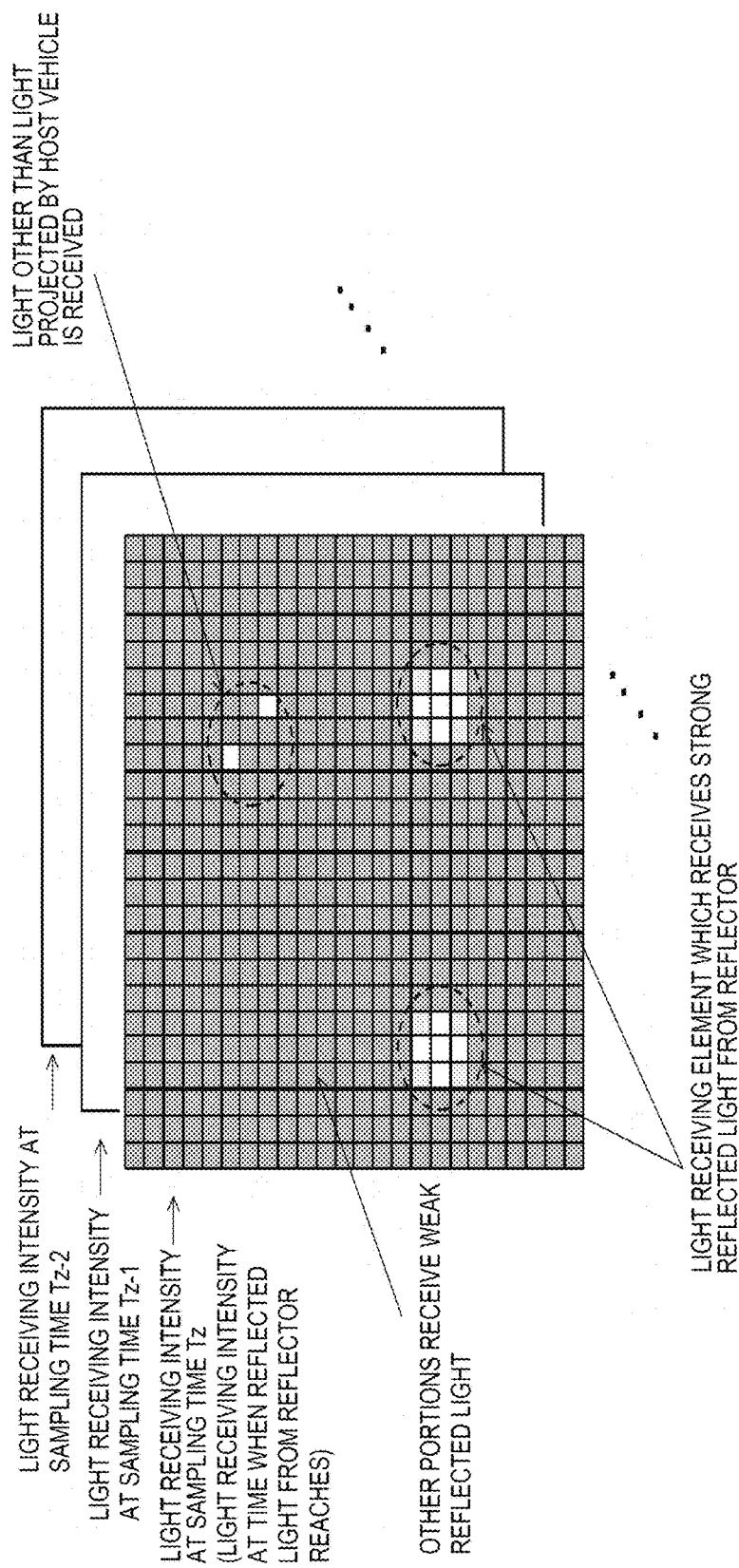
FIG. 7 is a schematic view showing a state of receiving intensity of a light receiving element array at each sampling time in the distance measurement device according to the first embodiment of the invention.

The signal processing unit 40 starts sampling from the time (light projection time) obtained from the control unit 50 when the light projection unit 10 starts to project the pulses, and continues sampling at a predetermined interval sufficiently smaller than the pulse width of measurement light. In regards to the sampling values, although significant values are not output until the light receiving elements 23 output the light receiving signals corresponding to reflected light, significant discrete values are obtained in a case where the light receiving signals corresponding to reflected light are output, and the sampling time when a peak is hit is set to the light receiving time. Accordingly, the time from the light projection time to the light receiving time is the time until pulsed light is projected, reflected, and received, and is proportional to the distance to the object 2; therefore, it is possible to calculate the distance between the vehicle 1 (host vehicle) and the preceding vehicle as the object 2 based on the time.

a method in which the pattern detection unit 32 detects the predetermined pattern based on a plurality of sampling values at the same time output from the signal processing unit 40 will be described referring to FIGS. 7 and 8. In FIG. 7, the sampling time when a peak is hit is expressed as Tz, the last sampling time before the sampling time Tz is expressed as Tz−1, and the second last sampling time before the sampling time Tz is expressed as Tz−2. Though not shown, the sampling time next to the sampling time Tz can be expressed as Tz+1. The light receiving signals of the respective sampling times output from the light receiving element array 22 are stored in the sampling time storage unit 34 and the light receiving intensity value storage unit 35.

At the sampling time Tz in this drawing, the light receiving intensity at the time when reflected light from the reflector of the preceding vehicle reaches the host vehicle 1 is included. Furthermore, a portion which receives light other than measurement light projected by the host vehicle 1 is illustrated. Since the entire predetermined pattern of the host vehicle 1 included in measurement light has such a size as to be included in the reflector, there is no case where only one light receiving element receives light with strong light receiving intensity in this way. This drawing shows a situation in which other portions receive only reflected light with weak light receiving intensity. A thin gray portion expresses that light receiving intensity is small compared to a white portion, and a thick gray portion indicates that light receiving intensity is smaller than the thin gray portion.

Figure 8:
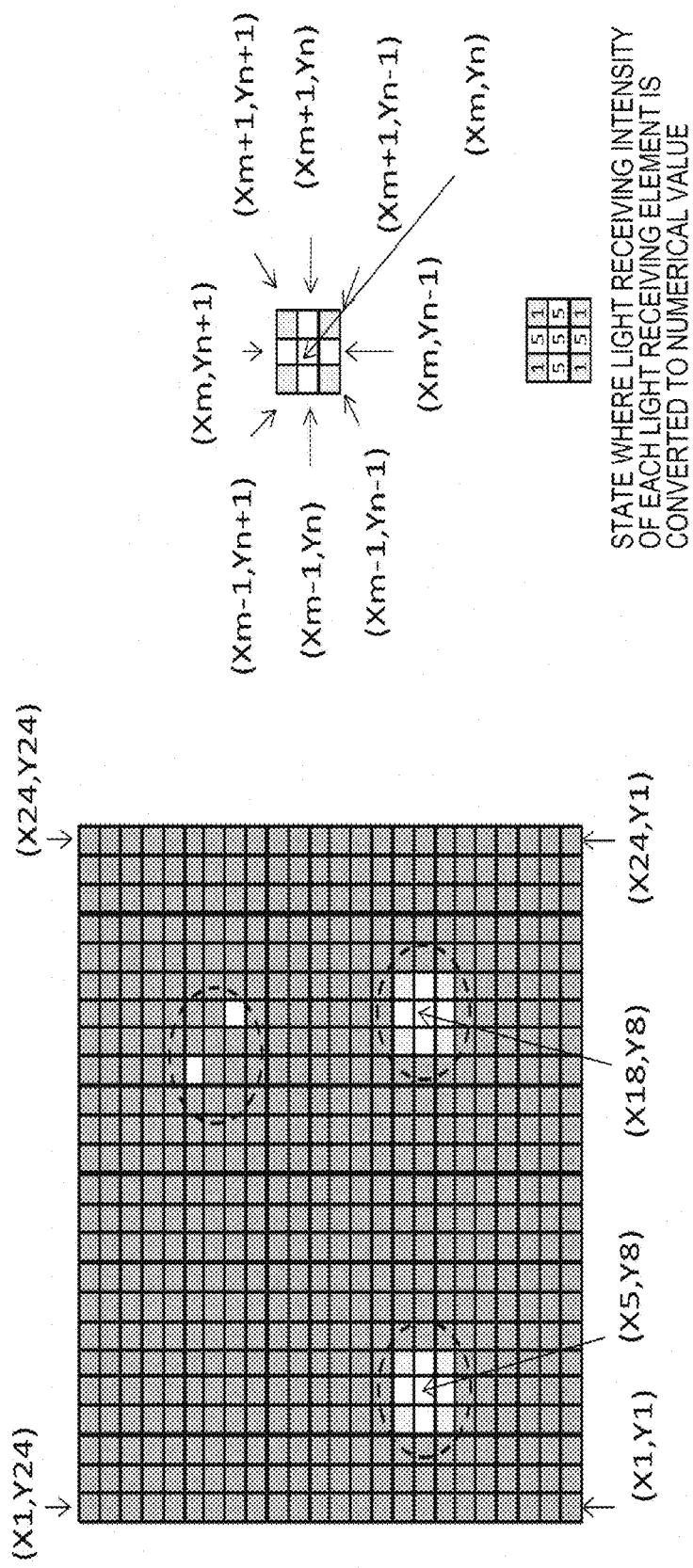
FIG. 8 is a schematic view illustrating a case where a predetermined pattern of measurement light of a host vehicle is detected based on the distribution of light receiving intensities in the distance measurement device according to the first embodiment of the invention.

FIG. 8 shows a way of pattern detection in the pattern detection unit 32 at the sampling time Tz at which a peak is hit. In the light receiving element array 22, the lower left light receiving element 23 is indicated as (X1,Y1), the lower right light receiving element 23 is indicated as (X24,Y1), the upper left light receiving element 23 is indicated as (X1, Y24), and the upper right light receiving element 23 is indicated as (X24,Y24). As a region which is considered as reflected light from the reflector of the preceding vehicle, there are regions having nine light receiving elements 23 respectively centering on (X5,Y8) and (X18,Y8). In the regions, the light receiving elements 23 (in a case where the central light receiving element is (Xm,Yn), (Xm−1,Yn−1), (Xm+1,Yn−1), (Xm−1,Yn+1), and (Xm+1,Yn+1)) at the four corners are small in light receiving intensity compared to other light receiving elements 23 (in a case where the central light receiving element is (Xm,Yn), (Xm,Yn−1), (Xm+1,Yn), (Xm−1,Yn), and (Xm,Yn+1)), and if the intensities of the nine light receiving elements 23 are numeralized, the intensities of the light receiving elements 23 at the four corners are 1, while the intensities of other light receiving elements 23 are 5.

As described above referring to FIG. 3, in the predetermined pattern projected by the light projection unit 10, similarly, the intensities of the light receiving elements 23 at the four corners are 1, while the intensities of other light receiving elements 23 are 5; therefore, it is possible to detect that reflected light is reflected light corresponding to the laser beam projected by the host vehicle based on the light receiving intensity of a region which is considered as reflected light from the reflector. With this, light received by the light receiving unit 20 is sampled and detected reliably, and the distance from the object is calculated based on the time of the sampling value when the predetermined pattern is detected, whereby it is possible to measure the distance at high speed.

Figure 9:
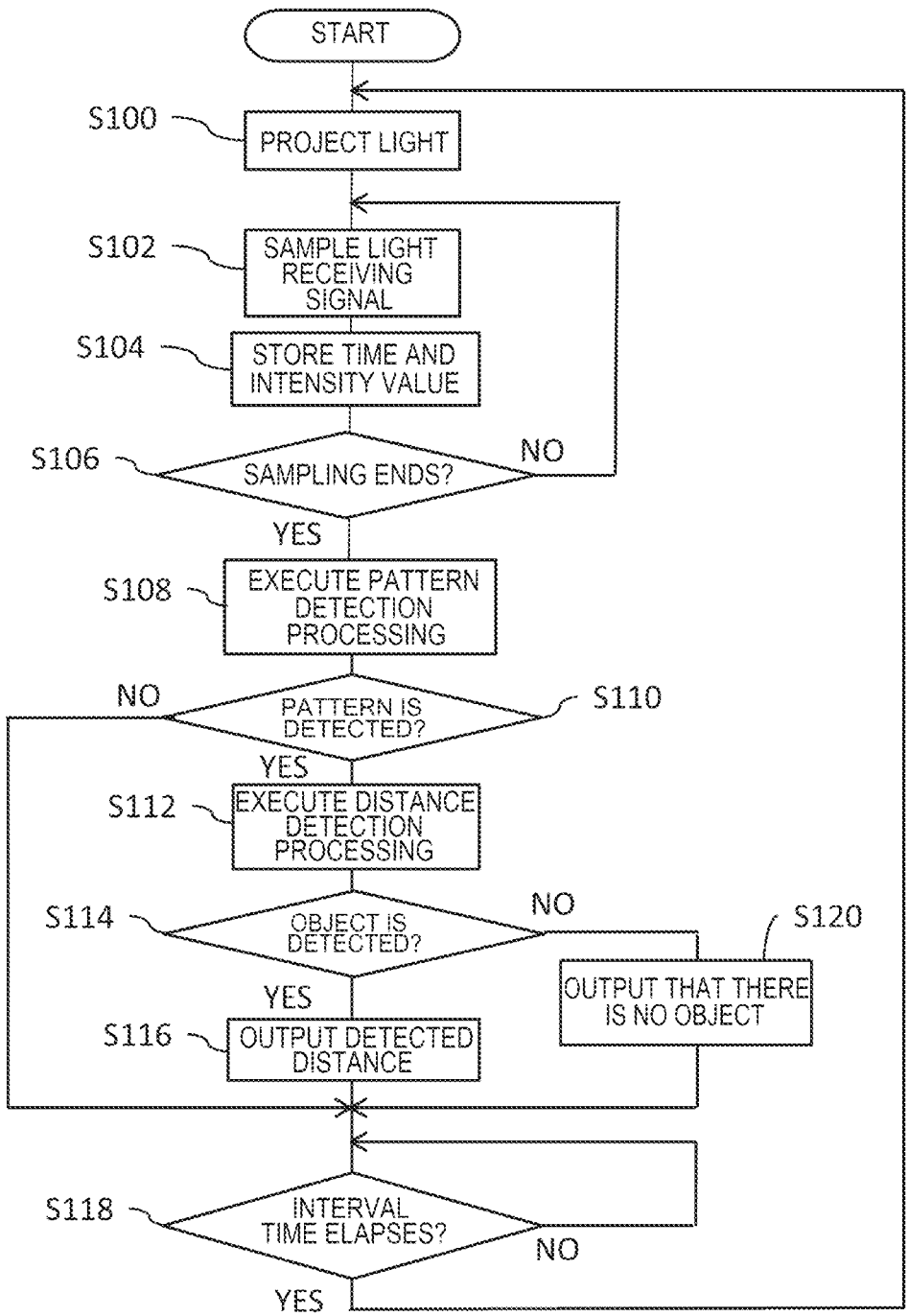
FIG. 9 is a flowchart showing a control method in the distance measurement device according to the first embodiment of the invention.
Figure 10:
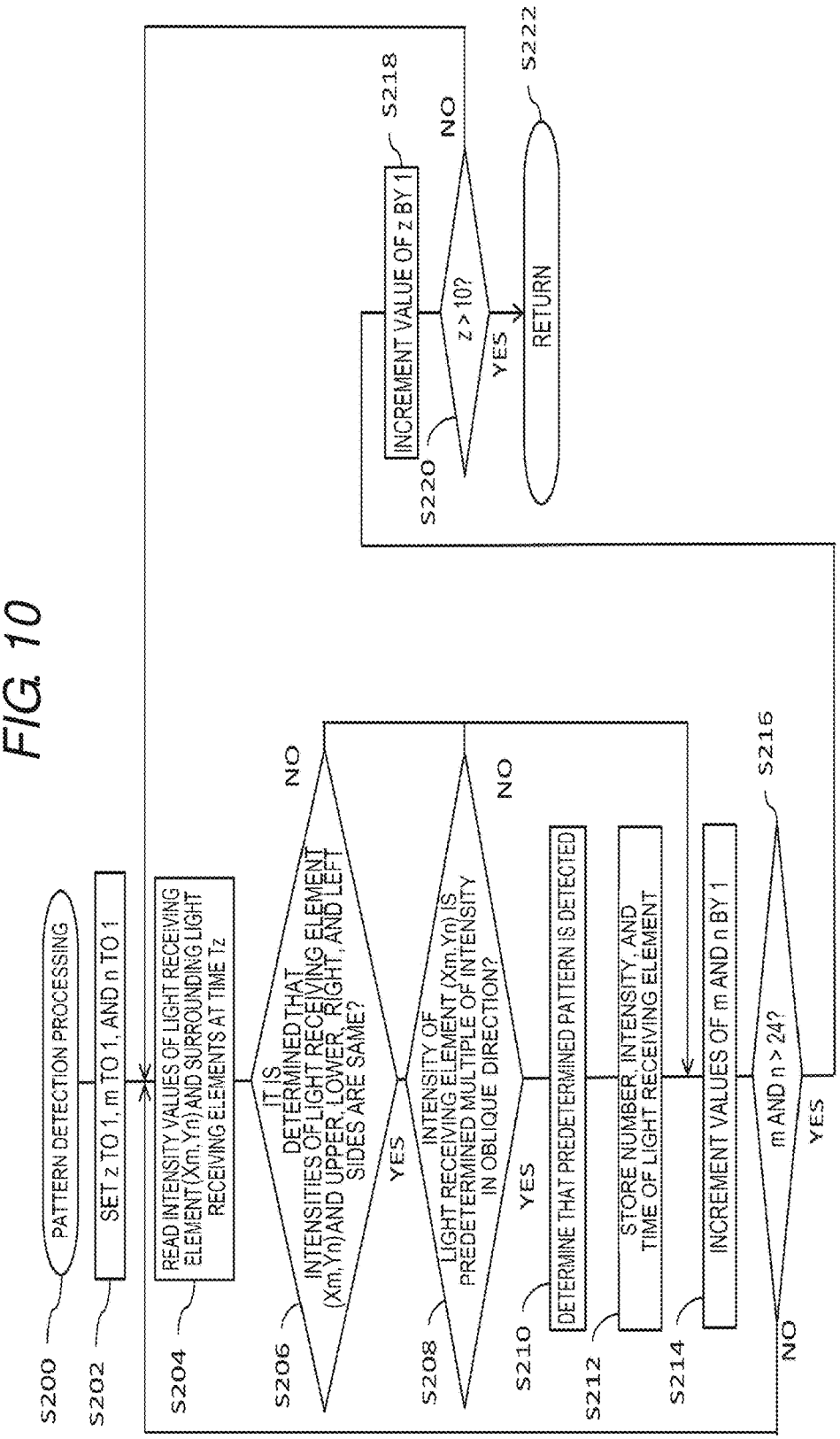
FIG. 10 is a flowchart showing a pattern detection processing method in the distance measurement device according to the first embodiment of the invention.

A control method in the distance measurement device 100 will be described referring to FIGS. 9 and 10. Note that S in the flowchart indicates a step. In S100, the light projection unit 10 projects a laser beam modulated in a predetermined pattern according to an instruction of the control unit 50. In S102, the signal processing unit 40 samples the light receiving signals output from the light receiving unit 20 which receives reflected light of the laser beam projected by the light projection unit 10. The data storage unit 33 obtains and stores the sampling time from the control unit 50 and the light receiving intensity value at each sampling time from the signal processing unit 40. Sampling and data storage are continued, for example, until the light projection unit 10 performs subsequent light projection or the like to end sampling.

In a case where sampling ends, in S108, the pattern detection unit 32 executes pattern detection processing. The pattern detection processing is described in S200 to S222 shown in FIG. 10. In S202, the pattern detection unit 32 performs initialization such that z of the sampling time Tz becomes 1, m of the light receiving element Xm becomes 1, and n of the light receiving element Yn becomes 1.

In S204, the pattern detection unit 32 reads the intensity values of the light receiving element (Xm,Yn) and the light receiving elements surrounding the light receiving element at the sampling time Tz. In this embodiment, it is assumed that the predetermined pattern of the laser beam projected by the light projection unit 10 is received by the nine light receiving elements described above.

In S206, the pattern detection unit 32 inspects whether or not the light receiving intensity of the light receiving element (Xm,Yn) and the light receiving intensities of the upper, lower, right, and left light receiving elements are the same. In a case where the light receiving intensities are the same, in S208, the pattern detection unit 32 inspects whether or not the light receiving intensity of the light receiving element (Xm,Yn) is a predetermined multiple (in this embodiment, five times) of the light receiving intensities of the light receiving elements in the oblique direction (the light receiving elements at the four corners among the nine light receiving elements). In a case where the light receiving intensities have the predetermined multiple relationship, in S210, the pattern detection unit 32 determines that light received by the light receiving unit 20 is reflected light corresponding to the predetermined pattern of the laser beam projected by the light projection unit 10. In S212, the pattern detection unit 32 stores the position number of the present light receiving element, the light receiving intensity, and the sampling time.

In a case where the position number of the light receiving element, and the like are stored in S212, in a case where the light receiving intensities are not the same in S206, and in a case where the light receiving intensities do not have the predetermined multiple relationship in S208, in S214, the pattern detection unit 32 adds 1 to the values of m and n. The pattern detection unit 32 repeats S204 to S214 described above until m and n become 24, that is, until the detection of all light receiving elements 23 in the light receiving element array 22 ends. In S216, in a case where it is determined that both m and n become 24, that is, in a case where the detection of all light receiving elements ends, in S218, the pattern detection unit 32 adds 1 to the value of z and repeats the processing of S204 to S216 for the subsequent sampling time. In S220, the pattern detection unit 32 repeats the processing for the number of times (in this embodiment, 10 times) of all sampling time, and in a case where all sampling times end, returns to S222.

In a case where the pattern detection unit 32 detects the predetermined pattern, in S112, the distance detection unit 31 executes distance detection processing, and determines the presence of a preceding vehicle (object 2) based on reflected light from the reflector attached to the rear portion or the like of the vehicle. The determination may be performed by vehicle type such that the preceding vehicle is a four-wheel vehicle in a case where the number of reflected light beams from the reflector is two, and is a motorcycle in a case where the number of reflected light beams from the reflector is one. In a case where it is determined that there is a preceding vehicle, in S116, the distance detection unit 31 calculates the distance from the preceding vehicle (object 2) based on the time when the light projection unit 10 projects light and the time when the light receiving unit 20 receives light. In a case where the presence of the preceding vehicle is not detected, in S120, the distance detection unit 31 outputs that there is no preceding vehicle (object 2). The distance measurement device 100 repeats S100 to S120 after a predetermined time interval elapses in S118.

As shown in FIG. 11, it is preferable that the predetermined pattern projected by the light projection unit 10 is asymmetrical in the vehicle width direction of the host vehicle 1. FIG. 11 shows a case where the host vehicle 1 and an oncoming vehicle (object 2) in which the same distance measurement device 100 is mounted are opposed. Although the distance measurement device 100 basically includes the predetermined pattern specific to the vehicle, since the number of predetermined patterns is limited, vehicles which project the same predetermined pattern may pass each other.

When the host vehicle 1 and the oncoming vehicle (object 2) travel in an opposed manner, since the distance measurement device 100 of the host vehicle 1 and the distance measurement device 100 of the oncoming vehicle are operated without being synchronized with each other, the laser beam transmitted from the light projection unit 10 of the distance measurement device 100 of the host vehicle 1 may be received by the light receiving unit 20 of the distance measurement device 100 of the oncoming vehicle, and so-called mutual interference may occur.

For example, the oncoming vehicle projects a predetermined pattern shown in (A) of FIG. 11, and the host vehicle projects a predetermined pattern shown in (B) of FIG. 11 in which the intensity of the laser beam is low in an L shape among nine grids. In a case where a pattern of reflected light corresponding to light projected from the host vehicle is viewed from the host vehicle, the same L shape is viewed as shown in (C) of FIG. 11. However, in a case where the predetermined pattern projected by the oncoming vehicle is viewed from the host vehicle, the pattern is viewed in a vertically inverted manner as shown in (D) of FIG. 11. In this way, in a case where the predetermined pattern projected by the light projection unit 10 is asymmetrical in the vehicle width direction, even if the patterns of measurement light respectively projected by the host vehicle and the oncoming vehicle are the same, since the pattern is asymmetrical, it is possible to perform identification.

The invention is not limited to the illustrated embodiment, and any configuration can be made without departing from the scope of the claims. That is, in the invention, although the specific embodiments are mainly illustrated in the drawings and described, those skilled in the art can make various modifications in the number of components, application examples, and other detailed configurations to the embodiments described above without departing from the technical idea or the range of the invention.

For example, although the predetermined pattern projected by the light projection unit 10 described above is formed of the nine square grids, the invention is not limited, and the number of grids or the shape of the grip is appropriately determined. For example, there are a variation shown in FIG. 12A of the pattern shown in FIG. 3, a variation shown in FIG. 12B of the pattern shown in FIG. 11, a variation shown in FIG. 12C in which a pattern is put in a T shape, a variation shown in FIG. 12D in which a pattern is formed of 4×4 grids, a variation shown in FIG. 12E in which a pattern is formed of 5×5 grids, and the like. Of course, these are just for illustration. The number of light receiving elements 23 constituting the light receiving element array 22 is not limited to the embodiments. A matching method of a pattern described in the flowchart of S202 to S220 is not limited thereto, and a matching method with excellent efficiency is used according to a predetermined pattern.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A vehicle-mountable distance measurement device which is mountable in a vehicle and which measures a distance from an object existing in surroundings, the vehicle-mountable distance measurement device comprising:
    a light projection unit which projects measurement light in which a two-dimensional predetermined lattice pattern specific to the vehicle is repeated;
    a light receiving unit comprising a plurality of light receiving elements which are arranged in a two-dimensional manner and which output light receiving signals in response to reception of light; and
    a distance detection unit which calculates the distance from the object based on a time when the light projection unit projects light and a time when the light receiving unit receives light,
    wherein the distance detection unit calculates the distance from the object based on the time when the light receiving unit receives the measurement light having the predetermined lattice pattern projected by the light projection unit, and
    wherein the two-dimensional predetermined lattice pattern is formed by the light projection unit, which is one single light projection unit, as asymmetrical in a vehicle width direction of the vehicle.

2. The vehicle-mountable distance measurement device according to claim 1, further comprising:
    a signal processing unit which samples the light receiving signals output from the respective light receiving elements of the light receiving unit and which outputs a plurality of sampling values; and
    a pattern detection unit which detects the predetermined lattice pattern based on the plurality of sampling values output from the signal processing unit,
    wherein the distance detection unit calculates the distance from the object based on, as the time when the light receiving unit receives light, a time of the plurality of sampling values at which the pattern detection unit detects the predetermined lattice pattern.

3. The vehicle-mountable distance measurement device according to claim 1, wherein the predetermined lattice pattern comprises a plurality of grids.

* * * * *